April 6, 1943. E. BILLINGS ET AL 2,316,043
TREATMENT OF PIGMENTS OR THE LIKE
Filed Jan. 30, 1939  2 Sheets-Sheet 1
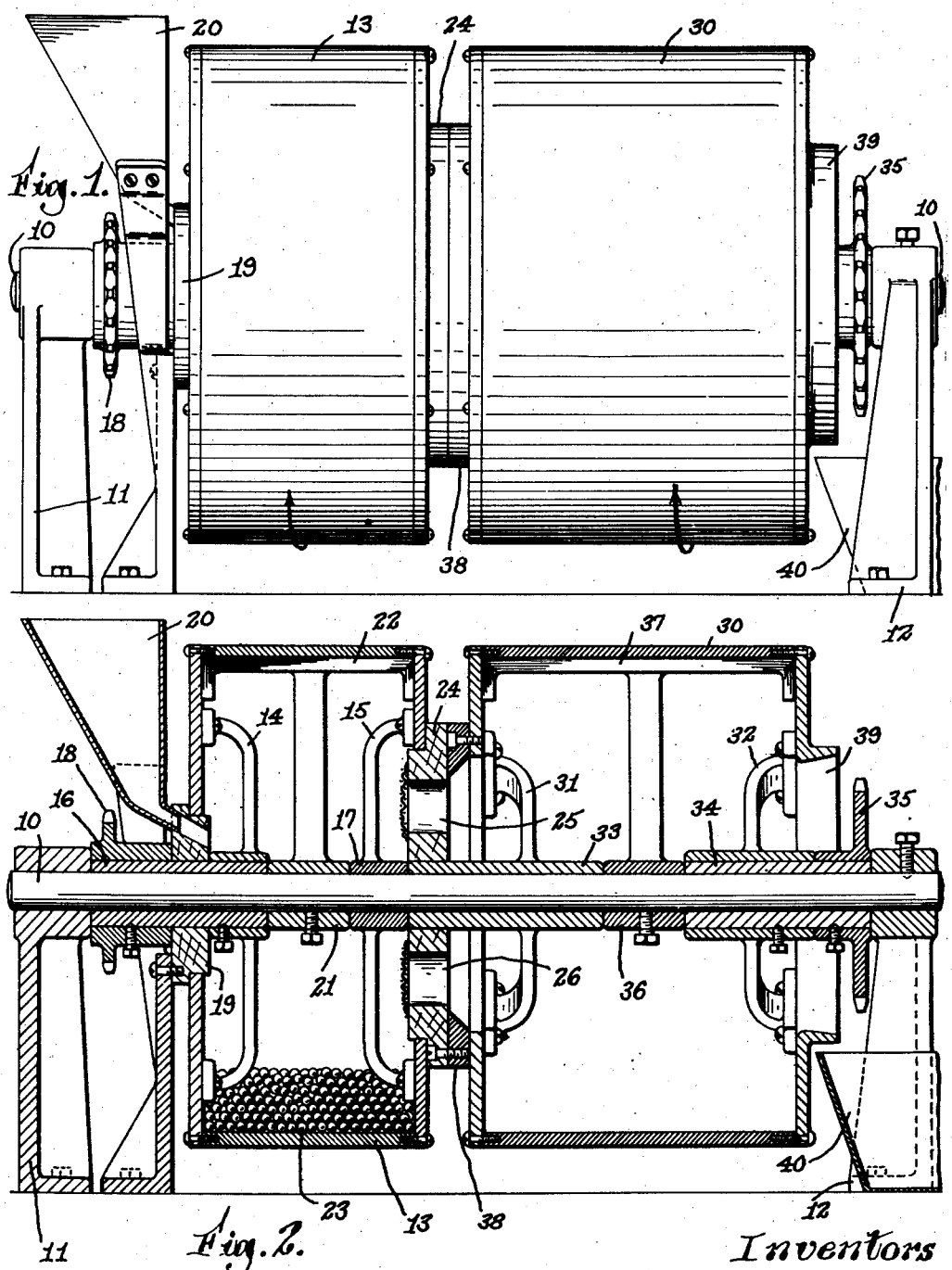

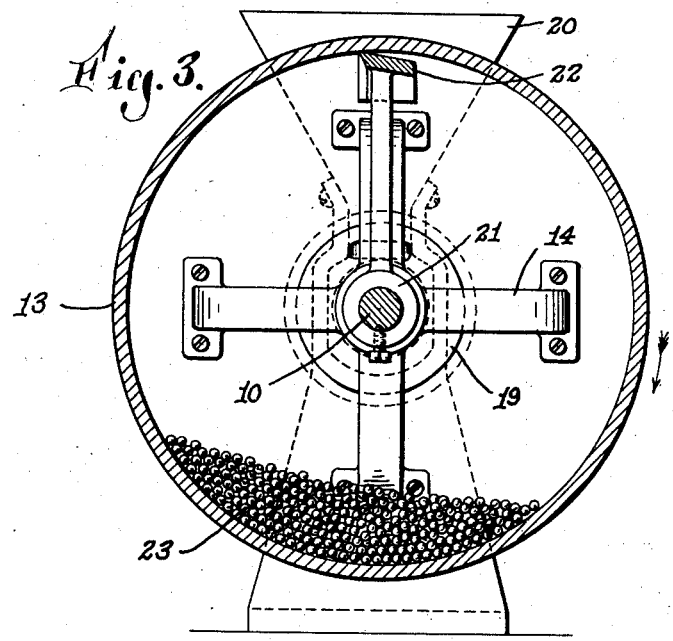
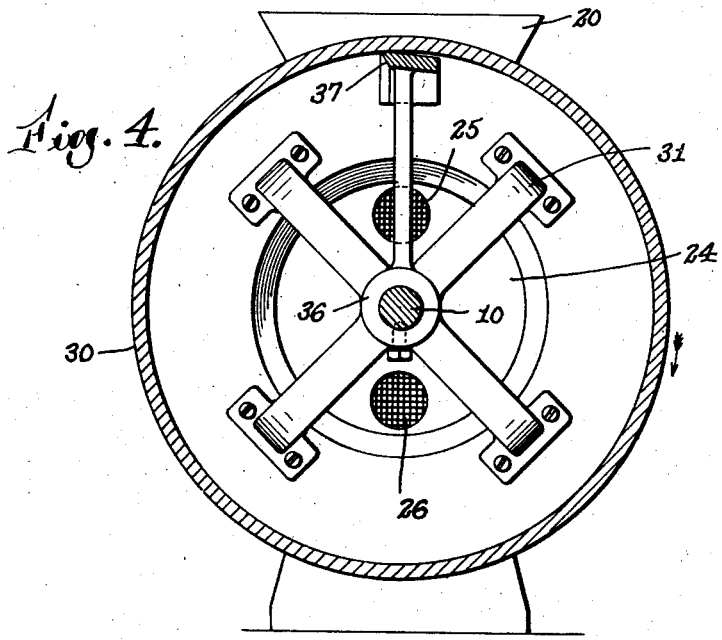

Patented Apr. 6, 1943

2,316,043

UNITED STATES PATENT OFFICE 2,316,043

TREATMENT OF PIGMENTS OR THE LIKE

Edmund Billings, Weston, and Harold H. Offutt, Winchester, Mass., assignors to Godfrey L. Cabot, Inc., Boston, Mass., a corporation of Massachusetts Application January 30, 1939, Serial No. 253,580

12 Claims. (Cl. 23—313)

This invention relates to the treatment of fine, dry, pigments or powders which derive their application in the arts and sciences from their fine state of sub-division. Any extreme degree of fineness carries with it an inevitable and generally undesirable concomitant of dustiness and this dustiness, arising from the minute weight of the individual particle, may lead to serious commercial consequences; for example, contamination of other nearby products and processes, excessive deterioration of fixtures, machinery and furnishings, and respiratory and other occupational disorders in the workmen exposed to the dust.

Certain powdered material of this type may be agglomerated by a purely mechanical treatment without the assistance of binders, solvents, liquids, tars or the addition either temporarily or permanently of any foreign substances. The agglomerates thus formed are of greater apparent density in bulk than the loose powders from which they are formed and consist of more or less spherical masses having such a high ratio of weight to surface that they are not dusty. Also they have comparatively smooth, polished, non-adherent surfaces and compact, adhesive internal structure. These characteristics give the resulting agglomerates a free-flowing characteristic which materially simplifies handling in bulk, homogeneous mixing with other ingredients, delivery by gravity through chutes or pipelines, packaging in any desired weight and all the other conveniences in handling and storing that are imparted to the product by fluidity and dustlessness.

Powders which normally display this behavior have certain other characteristics which serve to differentiate them from those powders which cannot be agglomerated by such treatment. For example, if jigged on a vibrating surface, they will agglomerate into small spheres of very fragile structure, they will form an adhesive lump when squeezed, they will adhere to metallic or non-metallic rods when these are forcibly drawn through a mass of the powder. Carbon black produced by burning natural gas flames against metallic surfaces, and stirred or agitated as usual preparatory to packaging, is one example of an agglomerative powder. There are a number of other fine dry powders, among them, all the carbon pigments commonly known as lamp blacks, zinc oxide, iron oxide, and certain clays (previously reduced to the requisite state of sub-division) which have the property in their normal commercial condition of agglomerating when subjected to suitable turbulent agitation and may thus be converted into small tenacious spherical granules capable of being handled and transported in bulk without substantial deterioration. Such powders are herein referred to as "naturally agglomerative powders."

In our prior Patent No. 2,120,541, granted June 14, 1938, we have disclosed a process of converting into granular form such agglomerative powders as agitated carbon black, but there are other fine powders which are unaffected when subjected, without supplementary treatment, to the process of our said prior patent. For example, neither quick lime or hydrated lime in their normal commercial condition are agglomerative powders and these may be subjected to turbulent agitation for an indefinite period without being agglomerated. It is with this class of powders, which we may term normally non-agglomerative and which thus differ in kind from agglomerative powders, that the present invention deals. We have discovered that such powders may be rendered agglomerative by pretreatment involving the application of mechanical stresses to the individual particles.

It may be that the agglomerative tendency in powders is due to minute disarrangement of the molecular pattern on the surface of each particle thus releasing an attractive force comparable to the force which holds each molecule of a crystal in its ordained relationship to the other molecules therein. Accordingly, the ease with which any given material is caused to exhibit agglomerative characteristics may be a converse function of the strength of the bond between its molecules.

We do not know the scientific reason for the agglomerative tendency of certain pigments; still less can we explain with reasonable certainty, the creation of an agglomerative tendency by the intimate application of mechanical stresses to individual particles comprising a charge of normally unagglomerative powder. One plausible reason for this effect may be that the particles are ground or broken into smaller sizes, with consequent increase in specific surface and reduction in average weight of particles. It may be that the phenomena of agglomeration are due to forces created or released by minute disarrangements of molecular structure on or near the surfaces of individual particles. We have observed changes in adsorption properties of many different powders when subjected to intimate mechanical stresses. Our experience leads us to believe that different powders vary in the quantity and magnitude of the physical stresses that must be applied to cause them to become distinctly agglomerative, and this difference appears to exist even between powders having the same general chemical constitution, e. g. various grades of zinc oxide, or of carbon black.

We have measured by relative adsorption tests the degree by which the surfaces of several different powders increase in adsorptive capacity during mechanical treatment. Carbon black apparently responds very readily to such treatment. The standard machinery which is used in commercial practice for producing turbulent agitation in a mass of carbon black particles apparently causes the carbon black to become increasingly adsorptive as turbulence is continued. However, we have found that there are more rapid methods of causing this change of character in carbon black and the most convenient of these is by the standard treatment of normal agitation. Thus we have found for instance that if we deliver normally agitated black to our commercial machinery for causing turbulent motion we can cause the charge in the machine to agglomerate very much more rapidly than if we deliver unagitated carbon black to it, all other conditions of manipulation being the same.

We have also found that it is more difficult to develop turbulent agitation in a charge of agglomerative carbon black than in a charge which has less pronounced agglomerative tendency. This is probably due to the fact that the agglomerative tendency makes large groups of particles move together without change of relationship and thus prevents turbulence and multi-directional impacts with relation to each other. We have discovered that agglomerative characteristics in fine powders can be most readily produced in machines which are not primarily designed to produce turbulent motion between the particles and that non-agglomerative powders may be treated by mechanical force not designed to produce turbulent agitation in the powders and that such powders, having been thus treated, can then be agglomerated into granules of the desired character in a machine designed to produce turbulent agitation of the particles.

The present invention accordingly consists in a novel process of converting into granular form powders which are normally non-agglomerative, the process being characterized by subjecting the particles of the non-agglomerative powder first to intimate mechanical stress and then to turbulent agitation, all without the necessity of recourse to any extraneous binding ingredient. The first step may be carried out in any form of apparatus which is effective to create molecular disarrangement of the particle surfaces, for example, a ball mill in which the powder may be ground with steel balls for an appreciable interval. The step of turbulent agitation may be carried out advantageously by such apparatus as is disclosed in our prior U. S. Letters Patent Nos. 2,120,540 or 2,120,541 or by other types of apparatus of which an example is disclosed in the present application. In the final step of the process a priming charge may be employed if desired to expedite the conversion of the material from flocculent to granular form.

In the step of subjecting the particles of powder to intimate mechanical stresses the material often develops a tendency to form wall cake within the apparatus. Preferably this is removed as formed and the material returned to the grinding zone, but alternatively the wall cake may be removed as a separate step, sifted through a screen and returned to the mill for further treatment. The material may be handled in successive charges or in a continuous operation wherein the pretreated powder is passed directly and continuously to a zone of turbulent agitation, or the powder may be fed in successive charges to the pretreating zone and automatically advanced to an agitating zone from which the granular product is turned out more or less continuously.

For purposes of illustration we will now proceed to describe a preferred process of converting hydrated lime from its usual finely powdered commercial form into a mass of spherical granules and in that connection we have disclosed one form of apparatus well suited for the purpose. In the accompanying drawings—

Fig. 1 is a view in elevation of the apparatus,

Fig. 2 is a view in longitudinal section of the apparatus shown in Fig. 1,

Fig. 3 is a view in cross section of the pretreating drum, and

Fig. 4 is a similar view of the agitating or agglomerating drum.

The illustrated apparatus includes in its organization a stationary horizontal shaft 10 securely supported at convenient height by standards 11 and 12. Upon the left hand end of the shaft, as shown in Figs. 1 and 2, is mounted a rotatable drum 13. The opposite heads of the drum are secured by spiders 14 and 15 to sleeves 16 and 17 respectively which are free to turn upon the shaft 10. The sleeve 16 is provided at its outer end with a sprocket wheel 18 through which the drum is rotated at the desired speed, for example, at a rate of 20 to 32 R. P. M.

The left hand head of the drum 13 is recessed to receive a stationary disk 19 carried by the standard 11 and through which a hopper 20 communicates with the interior of the drum. The sleeves 16 and 17 are spaced apart by a stationary collar 21 fast to the shaft 10 and from which projects a radial arm carrying a stationary scraper 22. This has a beveled edge arranged to rest lightly upon the upper side of the interior wall of the drum 13 and is effective to remove therefrom any material which may adhere to the drum in the operation of the apparatus. The drum 13 is herein shown as containing a mass of small balls or shot 23, for example, about 20 pounds of steel shot. The right hand head of the drum 13 is apertured to receive a rotatable disk 24 in which are provided a pair of discharge openings 25 and 26 both being covered at their inner ends by a fine screen mesh. These discharge openings are spaced from the axis of the drum by perhaps one-third or one-quarter of the distance to its circumference. The balls 23 therefore are located always below or beyond the discharge openings.

Upon the right hand end of the shaft 10 is independently supported the agitating or agglomerating drum 30. The heads of this drum are secured by spiders 31 and 32 to sleeves 33 and 34 respectively which are journalled upon the shaft 10. The right hand sleeve 34 carries at its outer end a sprocket wheel 35 by which the drum may be rotated at the desired speed, for example, 15 to 20 R. P. M. The sleeves 33 and 34 are spaced apart by a stationary collar 36 having a radial arm carrying a stationary scraper 37 arranged to bear at all times against the upper side of the inner wall of the drum 30 and to remove therefrom any wall cake which may adhere thereto and return the material to the mass being agitated in the drum. The left hand head of the drum 30 is provided with a large aperture which is surrounded by an externally attached ring 38 and to this is bolted the apertured disk 24. The latter is thus carried by the ring 38 in its rotation with the drum 30 and so turns at a reduced rate within the right hand head of the drum 13. At the figures already suggested for the speed of the drums 13 and 30, the disk 24 turns five to twelve R. P. M. in the right-hand head of the drum 13. The ring 38 serves to make a tight joint between the two drums so that all ground or pretreated material passing through the openings 25 and 26 from the drum 13 is discharged without loss into the drum 30.

The right hand head of the drum 30 is provided with an open hub 39 through which the agglomerated material may be discharged into a hopper 40 located adjacent to the standard 12.

In the illustrated apparatus the treating drum 13 is shown as considerably narrower than the agitating drum 30 and as adapted to be rotated at a higher rate of speed. These proportions and relative speeds are the best now known to us. They are not essential to our invention, however, but may be varied in adapting the process to different powdered materials.

In carrying out the process of our invention, for example with hydrated lime as a material, the grinding drum 13 may be rotated at about 20 R. P. M. and the agglomerating drum 30 at about 10 R. P. M. The fine dry powdered lime is introduced through the hopper 20 into the drum 13 as a series of small charges, one about every 15 minutes, while the grinding drum is maintained continuously rotating. The lime as introduced may have an apparent density in bulk of about 18 pounds per cu. ft. Several hours may be consumed in thus charging the activating drum and during that period the lime is subjected to the grinding action of the balls within the drum and each particle is subjected to intimate physical stress but without substantial change of appearance. It is found, however, that its density may have been slightly increased to perhaps 20 pounds per cu. ft. in this step.

After the drum 13 has been fully charged and the grinding process continued for perhaps 2 or 3 hours, the treated lime begins to reach a level in the drum at which it passes continuously in a small stream through the outlet openings 25 and 26 thereby reaching the interior of the agglomerating drum 30 without any intermission or ever having come to rest. The treated and now agglomerative powder reaching the drum 30 is therein subjected to turbulent agitation by the rotation of this drum and begins to assume the form of discrete, tenacious spherical granules substantially dustless in the mass and capable of being handled without substantial disintegration. These spherical granules collect in the drum 30 until they reach a level at which they are permitted to escape from the drum through the hollow hub 39 from which they flow into the hopper 40. During the entire process the scrapers 22 and 37 are effective in removing wall cake material and returning it either to the grinding zone or to the agglomerating zone of the apparatus as the case may be. It will be understood that the agitation imparted to the treated material in the drum 30 is caused by the material being carried up upon the rotating walls of the drum and continuously spilling downwardly in cascade fashion in substantially the manner described in our prior Patent No. 2,120,540.

While it is not essential to the process, it may be desirable in some cases to sift the granules delivered to the hopper 40 and to return the fines to the drum 30 as a priming charge. Under these circumstances the fines are quickly brought up to size and the time of the process correspondingly reduced. For example, as delivered to the hopper 40, the granules may vary from 200 mesh to as large as 40 mesh, and under such circumstances fines below 100 mesh may be returned to the drum 30 and in this way the minimum size of the granules in the mass may be fixed at about 100 mesh.

While I have referred to hydrated lime or quicklime as examples of material which may be treated advantageously by the novel process of our invention, many other fine dry powders or pigments will respond to the treatment above explained. We have in mind particularly lithopone, calcium carbonate, sodium carbonate, lead chromate, Prussian blue, chromium oxide, barium sulphate, brown or yellow ochre, zinc sulphite, antimony oxide, magnesium carbonate and others.

Having thus disclosed our invention we claim as new and desire to secure by Letters Patent:

1. A process of converting into granular form fine powders which are naturally non-agglomerative, characterized by the consecutive and related steps of first subjecting the particles of the powder in a dry state to intimate mechanical stress by grinding, thus imparting agglomerative properties thereto, and then subjecting the treated and now agglomerative powder to turbulent agitation without grinding until, without binding agents, it assumes the form of discrete tenacious and substantially dustless granules.

2. A process of converting into granular form fine powders which are normally non-agglomerative, characterized by the consecutive and related steps of grinding the powder in a dry state over a substantial interval of time in a ball mill, thus imparting agglomerative properties to the powder, and then subjecting the treated and now agglomerative powder to turbulent agitation without grinding until it assumes the form of discrete tenacious and substantially dustless granules free from extraneous binding material.

3. A process of converting into granular form fine powders which are normally non-agglomerative, characterized by the consecutive and related steps of first subjecting the particles of the powder to intimate mechanical stress by grinding in a dry state in a ball mill and simultaneously removing wall cake so that it is returned to the grinding zone, and then subjecting the powder thus treated and rendered agglomerative to turbulent agitation without grinding until, without binding agents, it assumes the form of discrete tenacious and substantially dustless granules.

4. A process of converting into granular form fine powders which are normally non-agglomerative, which consists in first grinding the powder in a dry state with steel balls for approximately four hours in a mill at a rate of about 30 R. P. M., thus imparting agglomerative properties to the powder, simultaneously removing wall cake from the mill, and then turbulently agitating the ground and now agglomerative powder until it is converted, without binding agents, into a mass of discrete tenacious free flowing substantially dustless spherical granules.

5. A process of converting into granular form fine powders which are normally non-agglomerative, which is characterized by the consecutive and related steps of grinding the powder in a dry state in the grinding zone of a ball mill for a substantial period and at a slow rate, thus rendering it agglomerative in character, removing the treated material progressively from this grinding zone and advancing it directly to a zone of turbulent agitation and there maintaining it until converted into a mass of substantially dustless, binder-free spherical granules.

6. A process of converting powdered lime to granular form, which is characterized by grinding the lime in a dry state in a ball mill operating at a medium speed, thus rendering the lime agglomerative in character, and then advancing it to a drum rotating at a lower speed and maintaining the ground lime in a condition of turbulent agitation therein until it appears as a mass of substantially dustless binder-free granules.

7. A process of converting into granular form fine powders which are normally non-agglomerative, characterized by the consecutive and related steps of grinding the non-agglomerative powder in a dry state in one zone to render the powder agglomerative, and then without interruption turbulently agitating the now agglomerative powder in another zone without the addition of any binding agent, and meanwhile continuously returning wall cake material to the grinding zone.

8. A process of converting into granular form powders which are normally non-agglomerative, characterized by the consecutive and related steps of treating the material in one zone by grinding in a dry state to impart agglomerative characteristics to it, continuously effecting a transfer of the material as treated from its grinding zone to a separate zone of turbulent agitation, and progressively drawing dustless granules from the zone of turbulent agitation, all without the addition of binding agents.

9. A process of converting into granular form fine powders which are normally non-agglomerative, characterized by the consecutive and related steps of grinding the powder in a dry state in a ball mill rotating at a constant rate and thereby imparting agglomerative characteristics to it, feeding the agglomerative powder thus formed progressively from the ball mill to an agitating drum rotating at a different rate wherein it is agglomerated without binder into granular form.

10. A process of converting into granular form fine powders which are normally non-agglomerative, characterized by the related and consecutive steps of first grinding the powdered material in a dry state to impart agglomerative characteristics to it, and then, without permitting the ground material to come to rest, turbulently agitating it without grinding to cause agglomeration without binder into discrete granules.

11. A process of converting into granular form fine powders which are normally non-agglomerative, characterized by the consecutive and related steps of first grinding the dry powder in a ball mill rotating at a constant rate to produce an agglomerative powder, and then, without permitting the treated powder to come to rest, agitating it in a drum rotating at a slower rate to cause agglomeration without binder into discrete granules.

12. A process of converting into granular form flocculent powders which are normally non-agglomerative, characterized by the consecutive and related steps of grinding the powder in a dry state in a drum rotating about a horizontal axis thus imparting agglomerative characteristics thereto, passing ground product endwise from the grinding drum itno a second drum, coaxially with the first, and then rotating the second drum at a different speed than the grinding drum to subject the ground and now agglomerative powder to turbulent agitation, all without the addition of binder.

EDMUND BILLINGS.
HAROLD H. OFFUTT.